US006952761B2

(12) United States Patent
John

(10) Patent No.: US 6,952,761 B2
(45) Date of Patent: Oct. 4, 2005

(54) BUS INTERFACE SELECTION BY PAGE TABLE ATTRIBUTES

(75) Inventor: Gwilt David John, Cambridge (GB)

(73) Assignee: ARM Limited, Cambridge (GB)

( * ) Notice: Subject to any disclaimer, the term of this patent is extended or adjusted under 35 U.S.C. 154(b) by 257 days.

(21) Appl. No.: 10/277,212

(22) Filed: Oct. 22, 2002

(65) Prior Publication Data

US 2003/0177333 A1 Sep. 18, 2003

(30) Foreign Application Priority Data

Mar. 12, 2002 (GB) .............................................. 0205814

(51) Int. Cl.[7] .......................... G06F 12/00; G06F 12/10
(52) U.S. Cl. ..................................... 711/207; 711/147
(58) Field of Search ................................. 711/130, 142, 711/143, 147, 202, 205, 203, 207; 710/306, 316, 107; 345/541, 568; 709/213–216

(56) References Cited

U.S. PATENT DOCUMENTS

| 5,423,008 A | 6/1995 | Young et al. | ................ | 710/107 |
| 5,963,976 A | 10/1999 | Ogawa et al. | ............... | 711/148 |
| 6,044,446 A | * 3/2000 | Joy et al. | ..................... | 711/203 |
| 6,253,290 B1 | * 6/2001 | Nakamoto | ................... | 711/138 |

FOREIGN PATENT DOCUMENTS

| EP | 0 113 612 A2 | 7/1984 |
| JP | 6 274638 A | 9/1994 |

* cited by examiner

Primary Examiner—Pierre M. Vital
(74) Attorney, Agent, or Firm—Nixon & Vanderhye P.C.

(57) ABSTRACT

A translation lookaside buffer 36 within a data processor serves to translate a virtual address VA to a physical address PA and return attribute values that are used to switch 40, 42 a data access request between different busses 44, 46 of the processor 18, 20.

26 Claims, 4 Drawing Sheets

BUS INTERFACE SELECTION BY PAGE TABLE ATTRIBUTES

BACKGROUND OF THE INVENTION

1. Field of the Invention

This invention relates to the field of data processing systems. More particularly, this invention relates to the bus architecture of data processing systems.

2. Description of the Prior Art

As is illustrated in FIG. 1 of the accompanying drawings, it is known to provide data processing systems including a plurality of processors 2, 4 connected to a common bus 6. Also connected to this common bus 6 is a shared memory 8 which is to be accessed by either of the processors 2, 4. Interrupt controllers 10, 12 for respective ones of the processors 2, 4 are connected via a bridge 14 to the bus 6. The interrupt controllers 10, 12 are not intended to be shared between the processors 2, 4, but nevertheless share the common bus 6.

The arrangement of FIG. 1 has a number of disadvantages. The processor 2 can access either of the interrupt controllers 10, 12 even though it should only really need and be allowed to access the interrupt controller 10. This can compromise the security and integrity of the system. In order that the processors 2, 4 can correctly address their respective interrupt controllers 10, 12 that share the common bus 6, they must run different binary images of the software concerned and are not able to share common software. Since all of the communications are routed over the bus 6, the bandwidth available on this bus is reduced disadvantageously.

SUMMARY OF THE INVENTION

Viewed from one aspect the present invention provides an apparatus for processing data, said apparatus comprising:

(i) a data processing circuit operable to generate a data access request to a first address;

(ii) a translation circuit operable to translate said first address to a second address and read one or more attribute values associated with said first address; and (iii) a bus switching circuit operable in response to said one or more attribute values to direct said data access request to said second address via either a first data access bus or a second data access bus.

The invention recognises that the address translation circuit which is commonly provided within a data processing system with attribute values associated with different address ranges may be used to store attributes that have the affect of controlling a bus switching circuit in order to switch a data access request between busses. This is an efficient and architecturally attractive route to provide control of multiple busses in a manner that allows some of the above problems to be addressed.

Whilst it will be appreciated that the address translation could take a wide variety of forms, in preferred embodiments the first address is a virtual address and the second address is a physical address. Such systems often use a translation circuit with associated attributes and thus allow the attributes to also control bus switching.

A particularly efficient preferred form of translation circuit is a translation lookaside buffer.

Whilst the address space may be controlled in a variety of different ways, preferred embodiments of the invention are ones in which the attribute values are memory page attribute values. The level and granularity at which memory pages are controlled is well matched to the level and granularity at which it is desirable to control switching between different busses.

Whilst it will be appreciated that the first bus and the second bus may have a wide variety of different properties associated with them and may be symmetrical in certain situations, particularly preferred embodiments are ones in which one of the busses is a sharable bus and the other of the busses is a private bus. This allows security to be improved by locating private peripherals on the private bus and also offloads communication requirements from the sharable bus as this may typically have more demands upon its bandwidth.

In the context of a system having a sharable bus and a private bus, preferred embodiments include a further data processing circuit that is also operable to generate data access requests and which is connected to the sharable bus.

Efficient use of the sharable bus and private bus architecture may be made in embodiments in which the shared memory is connected to the sharable bus and private peripherals are connected to the private bus of respective data processing circuits.

Whilst the attribute values used could take a wide variety of different forms and represent a wide variety of different properties, for example it would be possible to provide a dedicated specific attribute directly specifying the bus to be used, preferred embodiments of the invention reuse attributes which are provided to indicate further characteristics, such as an attribute indicating whether the address is associated with a device having normal data storage operation or other than normal data storage operation (e.g. either a standard memory in which data stored is not changed or a peripheral in which data stored is not necessarily guaranteed to remain unchanged due to other influences). A further attribute which may be used to help control bus switching is one indicating whether the first address is associated with a shareable storage location.

A particularly preferred embodiment is one in which said bus switching circuit is operable to:

(i) direct said data access request to said first bus when said first address is associated with a memory having a normal storage operation or a shareable storage location; and (ii) direct said data access request to said second bus when said first address is associated with a device having other than a normal storage operation and a non-shareable storage location.

The present technique is particularly well suited to systems in which it is desired to perform symmetric multiprocessing. Within such systems it is desirable that the different data processing circuits are controlled by a common computer program.

Whilst the attributes stored in the translating circuit could take a variety of forms, preferred attributes include ones indicating that the associated memory locations should support strongly ordered accesses in which a pending access request must be fully completed before a next access request is started, that a memory location is non-cacheable, that a memory address is write-through-cacheable, that a memory address is write-back-cacheable or that a memory location corresponds to device memory.

Viewed from another aspect the present invention provides a method of processing data, said method comprising the steps of:

(i) generating a data access request to a first address with a data processing circuit;

(ii) translating said first address to a second address and read one or more attribute values associated with said first address; and (iii) in response to said one or more attribute values, directing said data access request to said second address via either a first data access bus or a second data access bus.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
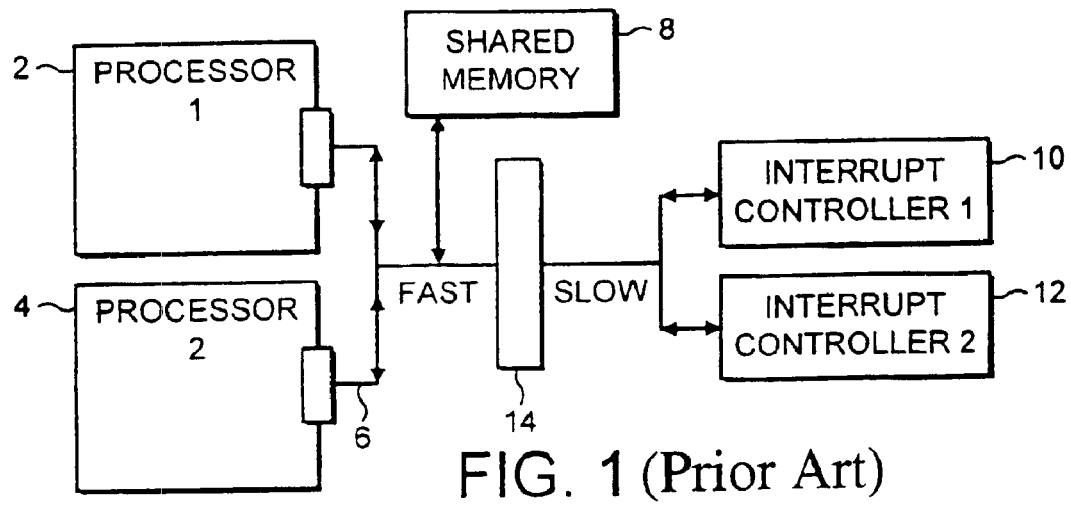
FIG. 1 illustrates a system having mutliple processors in which all data accesses are routed over a common bus.
Figure 2:
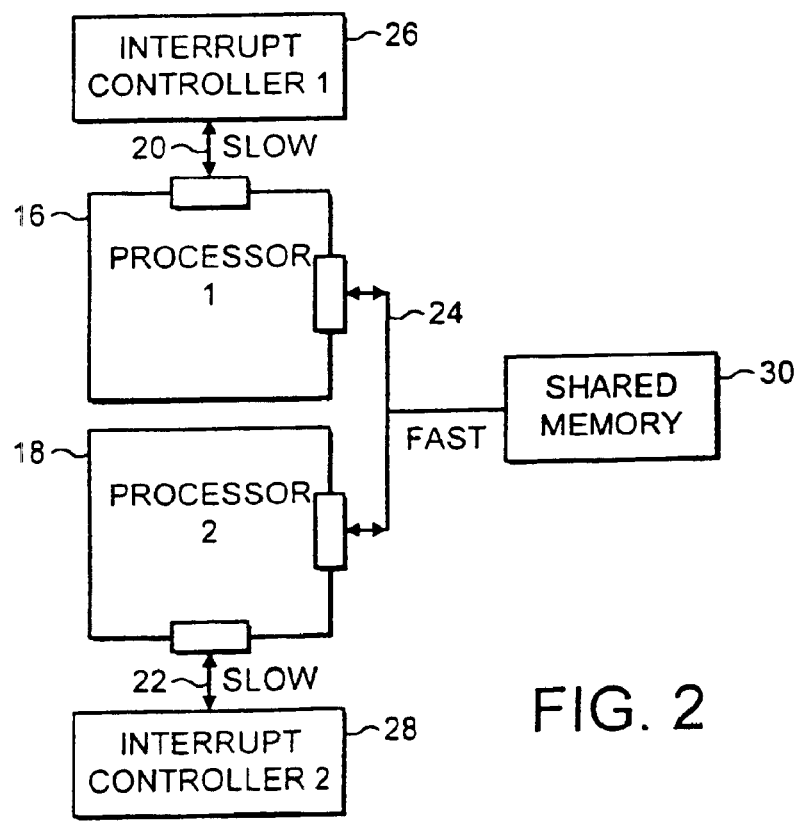
FIG. 2 illustrates a system having multiple processors each having a private bus and a sharable bus.

FIG. 2 illustrates a data processing system including a first data processing circuit 16 (a data processing core) and a second data processing circuit 18. Each of these data processing circuits 16, 18 has its own respective private bus 20, 22 as well as being connected to a common sharable bus 24. A private peripheral in the form of an interrupted controller 26 for processor 1 is connected to the private bus 20, a private peripheral in the form of an interrupt controller 28 for the processor 2 is connected to the private bus 22. A shared memory 30 is connected to the sharable bus and is able to communicate with both the processor 1 and the processor 2.

Figure 3:
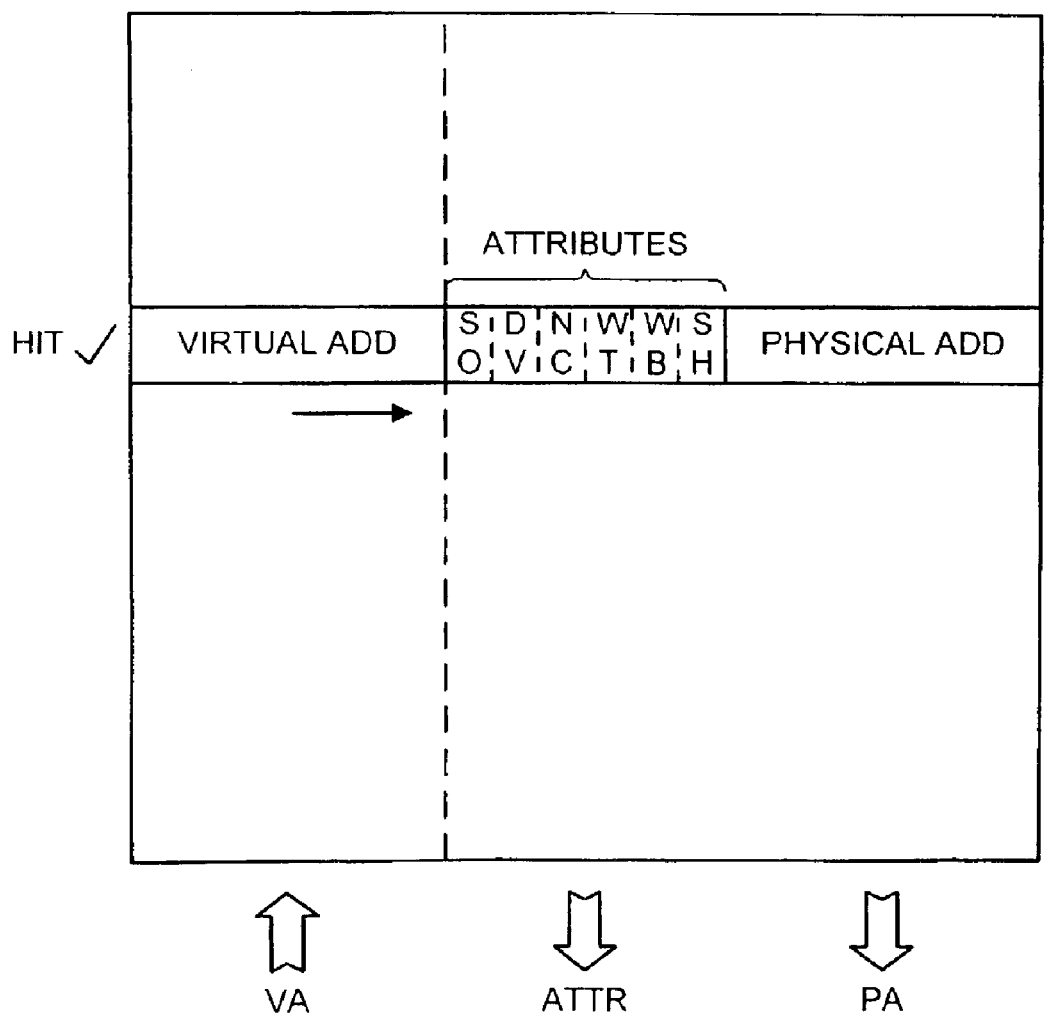
FIG. 3 schematically illustrates the use of a translation lookaside buffer.

FIG. 3 illustrates the operation of a translation lookaside buffer which is provided within each of the processors 16, 18 of FIG. 2. The processor 16, 18 generates a data access request as a result of program execution and having a virtual address associated with it. This virtual address VA needs to be translated to a physical address PA in the translation lookaside buffer. The translation lookaside buffer contains a plurality of page table entries having a portion which specifies the range of virtual addresses to which it applies. This virtual address portion may be stored in the comparison part of a content addressable memory which forms part of the translation lookaside buffer. The virtual address VA is effectively compared in parallel with all of the page table entries and when a match occurs between the virtual address VA applied and the virtual address stored for a particular page table entry, then a hit is recorded for that page table entry. Associated with that page table entry is a physical address portion which enables the virtual address VA to be translated to the physical address PA (e.g. appropriate higher order bits being subject to a translation with lower order bits being unaltered).

Also associated with the page table entry are a number of attribute values which control the way in which those memory address locations associated with the page table entry are accessed and treated. In particular, these attribute values include attributes indicating that the memory is strongly ordered, associated with a device rather than standard memory, non-cacheable, write-through-cacheable, write-back-cacheable and shareable. Strongly ordered memory is subject to control such that any pending memory access request to that memory must be completed before a next memory access request can be commenced. Device memory is defined as memory which does not necessarily have normal storage operation in the sense that value stored at a particular location can change through external influences other than simple reads and writes to those locations, as well as other non-standard behaviour. Whether a particular memory address is cacheable, write-through-cacheable or write-back-cacheable is also specified with these terms having their usual meanings. The shareable attribute indicates whether the memory locations may be accessed by more than one processor.

At an overall level, the translation lookaside buffer operates with a virtual address VA applied to it resulting in a hit for a particular page table entry which then results in the attribute values associated with that page table entry as well as the corresponding physical address PA being returned from the translation lookaside buffer.

Figure 4:
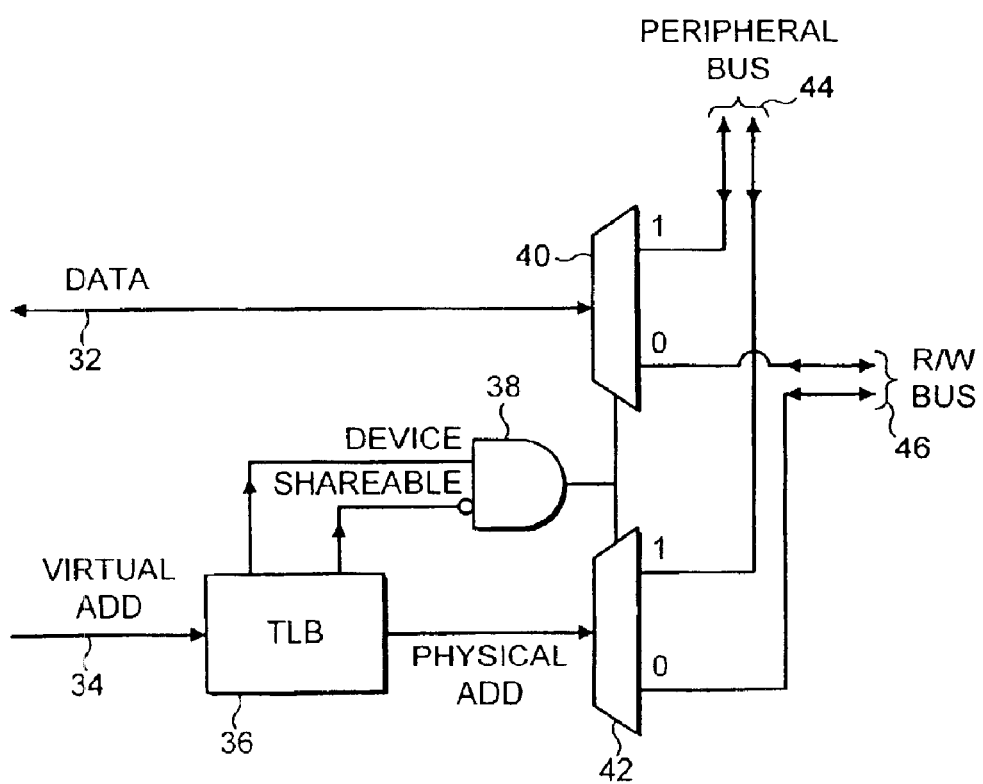
FIG. 4 illustrates a circuit for controlling bus switching.

FIG. 4 illustrates a circuit for controlling the switching between different busses. A data access request includes data transferred on a data bus portion 32 and a virtual address VA asserted on an address bus 34. The virtual address is applied to the translation lookaside buffer 36. Whilst it will be appreciated that more attributes than illustrated are read out of the translation lookaside buffer 36, FIG. 4 illustrates the two attributes indicating that the memory location is associated with a device and that the memory location is sharable as being read out and applied to an AND gate 38. Also emerging from the translation lookaside buffer 36 is the physical address PA into which the virtual address VA has been translated. The AND gate 38 controls respective demultiplexers 40, 42 associated with the data bus 32 and the address bus 34 portions. If the attribute values indicate that the memory address is associated with the virtual address VA corresponds to a device and is non-shareable, then the access request is directed to the peripheral bus 44. In other combinations, such as the memory location not being associated with a device or the memory location being sharable, then the data access request is directed to the sharable read/write bus 46.

Figure 5:
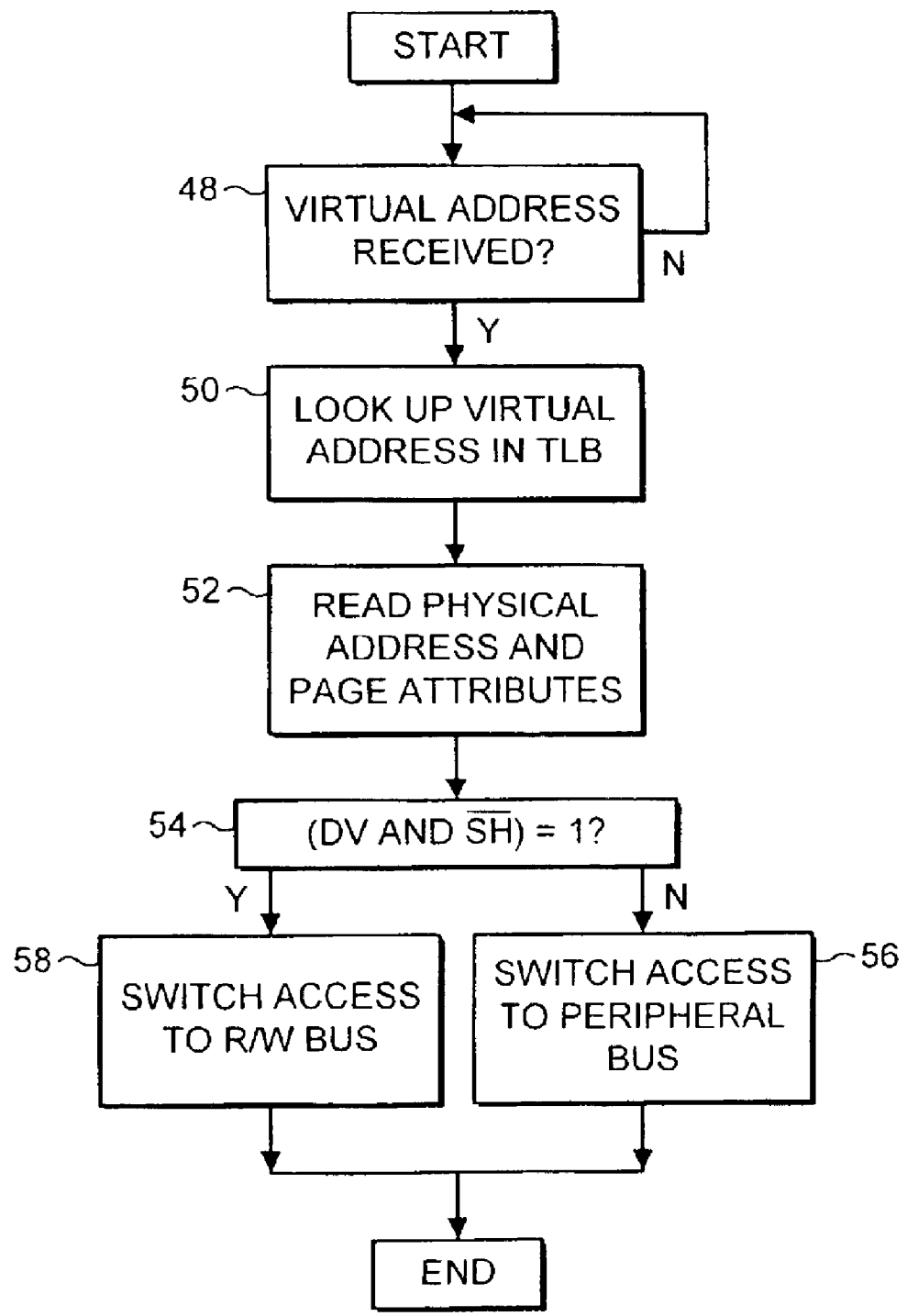
FIG. 5 is a flow diagram schematically illustrating the processing performed in controlling bus switching.

FIG. 5 schematically illustrates the processing performed in controlling bus switching. At step 48 the system waits for a virtual address VA to be received. When the virtual address VA has been received, then this results in a lookup being performed in the translation lookaside buffer 36 at step 50. At step 52, when the appropriate hit has occurred the relevant page table entry is accessed to read the physical address PA and page attributes from that page table entry. At step 54 a determination is made as to whether the attributes indicate that the memory location is associated with a device AND the memory location is sharable. If this Boolean condition is satisfied, then processing is directed to step 56 with the demultiplexers 40 and 42 being switched to direct the memory access to the peripheral bus. If the determination at step 54 does not return a true value, then processing proceeds to step 58 with the multiplexers 40, 42 redirecting the data access request to the shareable read/write bus 46.

The bus switching control as described above is well suited to symmetric multiprocessing. In particular, the different processors may run identical binary images of a computer program since their private peripherals are isolated on their own private busses. The common data being worked upon may be stored within the shared memory 30 accessed via the sharable bus 24.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed:

1. Apparatus for processing data, said apparatus comprising:
   (i) a data processing circuit operable to generate a data access request to a first address:
   (ii) a translation circuit for storing a plurality of page table entries and for reading a page table entry associated with said first address as part of translating said first address to a second address, said page table entry including at least one attribute value associated with said first address: and
   (iii) a bus switching circuit operable in response to said at least one atribute value to direct said data access request to said second address via one of a first data access bus and a second data access bus, wherein said at least one attribute value comprises a device attribute indicating that said first address is associated with one of a memory having normal data storage operation and a device having other than normal data srorage operation, wherein said at least one attribute value comprises a shareable attribute indicating that said first address is associated with one of a shareable storage location and a non-sharcable storage location and said bus switching circuit is operable to:
      (i) direct said data access request to said first bus when said first address is asssociated with a memory having one of a normal storage operation and a shareable storage location; and
      (ii) direct said data access request to said second bus when said first address is associated with a device having other than a normal storage operation and a non-shareable storage location.

2. A method of processing data, said method comprising the step of;
   (i) generating a data access request to a first address with a data processing circuit;
   (ii) translating said first address to a second address using a page table entry read from a translation circuit for storing a plurality of page table entries, said nage table entry including at least one attribute value associated with said first address; and
   (iii) in response to said at least one attribute value, directing said data access request to said second address via one of a first data access bus and a second data access bus, wherein said at least one attribute value comprises a device attribute indicating that said first address is associated with one of a memory having normal data storage operation and a device having other than normal data storage operation wherein said at least one attribute value comprises a shareable attribute indicating that said first address is associated with one of a shareable storage location and a non-shareable storage location and data access request is directed to:
      (i) said first bus when said first address is associated with a memory having one of a normal storage operation and a shareable storage location; and
      (ii) to said second bus when said first address is associated with a device having other than a normal storage operation and a non-shareable storage location.

3. Apparatus for processing data, said apparatus comprising:
   (i) a data processing circuit operable to generate a data access request to a first address;
   (ii) a translation circuit operable to translate said first address to a second address and read at least one attribute value associated with said first address;
   (iii) a bus switching circuit operable in response to said at least one attribute value for directing said data access request to said second address via one of a first data access bus and a second data access bus;
   wherein said at least one attribute value comprises a device attribute indicating that said first address is associated with one of a memory having normal data storage operation and a device having other than normal data storage operation; and
   said at least one attribute value comprises a shareable attribute indicating that said first address is associated with one of a shareable storage location and a non-shareable storage location and said bus switching circuit comprising a means for:
      (i) directing said data access request to said first bus when said first address is associated with a memory having one of a normal storage operation and a shareable storage location; and
      (ii) directing said data access request to said second bus when said first address is associated with a device having other than a normal storage operation and a non-shareable storage location.

4. Apparatus as claimed in claim 3, wherein said first address is a virtual address and said second address is a physical address.

5. Apparatus as claimed in claim 3, wherein said translation circuit is a translation lookaside buffer.

6. Apparatus as claimed in clalm 3, wherein said at least one attribute value is a memory page attribute value.

7. Apparatus as claimed in claim 3, wherein said first bus is a shareable bus and said second bus is a private bus.

8. Apparatus as claimed in claim 7, comprising a further data processing circuit operable to generate a data access request and connected to said shareable bus.

9. Apparatus as claimed in claim 8, comprising a shared memory connected to said ahareable bus.

10. Apparatus as claimed in claim 8, wherein said data processing circuit and said further data processing circuit are operable to perform symmetric multiprocessing.

11. Apparatus as claimed in claim 8, wherein said data processing circuit and said further data processing circuit are controlled by a common computer program.

12. Apparatus as claimed in claim 7, comprising a private peripheral connected to said private bus.

13. Apparatus as claimed in claim 3, wherein said at least one attribute value comprises a shareable attribute indicating that said first address is associated with one of a shareable storage location and a non-shareable storage location. program.

14. Apparatus as claimed an claim 3, wherein said at least one attribute value includes at least one of:
   (i) strongly ordered;
   (ii) non-cacheable;
   (iii) cacheable write-through; and
   (iv) cacheable write-back.

15. A method of processing data, said method comprising the steps of:
   (i) generating a data access request to a first address with a data processing circuit;

(ii) translating said first address to a second address and read at least one attribute value associated with said first address; and (iii) in response to said at least one attribute value, directing said data access request to said second address via one of a first data access bus and a second data access bus wherein said at least one attribute value comprises a device attribute indicating that said first address is associated with one of a memory having normal data storage operation and a device having other than normal data storage operation; and wherein said at least one attribute value comprises a shareable attribute indicating that said first address is associated with one of a shareable storage location and a non-shareable storage location and said data access request is directed to:

(i) said first bus when said first address is associated with a memory having one of a normal storage operation and a shareable storage location; and (ii) to said second bus when said first address is associated with a device having other than a normal storage operation and a non-shareable storage location.

16. A method as claimed in claim 15, wherein said first address is a virtual address and said second address is a physical address.

17. A method as claimed in claim 15, wherein said translating is performed by a translation lookaside buffer.

18. A method as claimed in claim 15, wherein said one or more attribute values are memory page attribute values.

19. A method as claimed in claim 15, wherein said first bus is a shareable bus and said second bus is a private bus.

20. A method as claimed in claim 19, comprising generating a further data access request with a further data processing circuit connected to said shareable bus.

21. A method as claimed in claim 20, wherein a shared memory is connected to said shareable bus.

22. A method as claimed in claim 20, wherein said data processing circuit and said further data processing circuit perform symmetric multiprocessing.

23. A method as claimed in claim 20, wherein said data processing circuit and said further data processing circuit are controlled by a common computer program.

24. A method as claimed in claim 19, wherein a private peripheral is connected to said private bus.

25. A method as claimed in claim 15, wherein said at least one attribute comprises a shareable attribute indicating that said first address is associated with one of a shareable storage location and a non-shareabie storage location.

26. A method as claimed in claim 15, wherein said at least one attribute value includes at least one of:

(i) strongly ordered;

(ii) non-cacheable;

(iii) cacheable write-through; and (iv) cacheable write-back.

* * * * *

UNITED STATES PATENT AND TRADEMARK OFFICE
CERTIFICATE OF CORRECTION

| | | |
|---|---|---|
| PATENT NO. | : 6,952,761 B2 | Page 1 of 1 |
| APPLICATION NO. | : 10/277212 | |
| DATED | : October 4, 2005 | |
| INVENTOR(S) | : Gwilt | |

It is certified that error appears in the above-identified patent and that said Letters Patent is hereby corrected as shown below:

Title page, item (12) "John" should read --Gwilt--

Title page, item (75) Inventor, should read: --David John Gwilt--

Signed and Sealed this

Fifteenth Day of June, 2010

David J. Kappos
*Director of the United States Patent and Trademark Office*